United States Patent [19]

Reynolds

[11] 4,394,059
[45] Jul. 19, 1983

[54] CONNECTOR OF A TYPE USED WITH DRY CELL BATTERIES AND MANUFACTURING METHOD

[75] Inventor: Charles E. Reynolds, Mechanicsburg, Pa.

[73] Assignee: AMP Incorporated, Harrisburg, Pa.

[21] Appl. No.: 289,443

[22] Filed: Aug. 3, 1981

[51] Int. Cl.³ .............................................. H01M 2/04
[52] U.S. Cl. ................................ 339/125 R; 29/623.1;
339/152; 339/191 R; 429/121; 429/178
[58] Field of Search ................. 339/152, 108 TP, 125,
339/191 R; 429/1, 158, 159, 121, 178, 179, 181;
29/730, 731, 623.1, 623.2, 623.3, 623.4, 623.5

[56] References Cited

U.S. PATENT DOCUMENTS

| | | | |
|---|---|---|---|
| 1,368,817 | 2/1921 | Marko | 429/181 X |
| 1,983,037 | 12/1934 | Koch | 429/159 |
| 2,225,460 | 12/1940 | Porth . | |
| 3,056,850 | 10/1962 | Rauske . | |
| 4,087,595 | 5/1978 | Mallery et al. | 429/153 |
| 4,226,497 | 10/1980 | Polonsky | 339/184 M |

Primary Examiner—Mark Rosenbaum
Attorney, Agent, or Firm—Frederick W. Raring

[57] ABSTRACT

A connector of a type used with dry cell batteries comprises an insulating support having a snap fastener plug terminal and a snap fastener socket terminal on one surface thereof. The support has terminal supporting projections on its one surface and the terminals are stamped and formed sheet metal members. The terminals are partially inserted through the support so that the external contact portions of the terminals are against the terminal supporting projections and the internal or second contact portions of the terminals are on the reverse surface of the support. The connector can be used as a closure for the jacket of a 9-volt battery. A manufacturing method for the connector is also disclosed.

22 Claims, 9 Drawing Figures

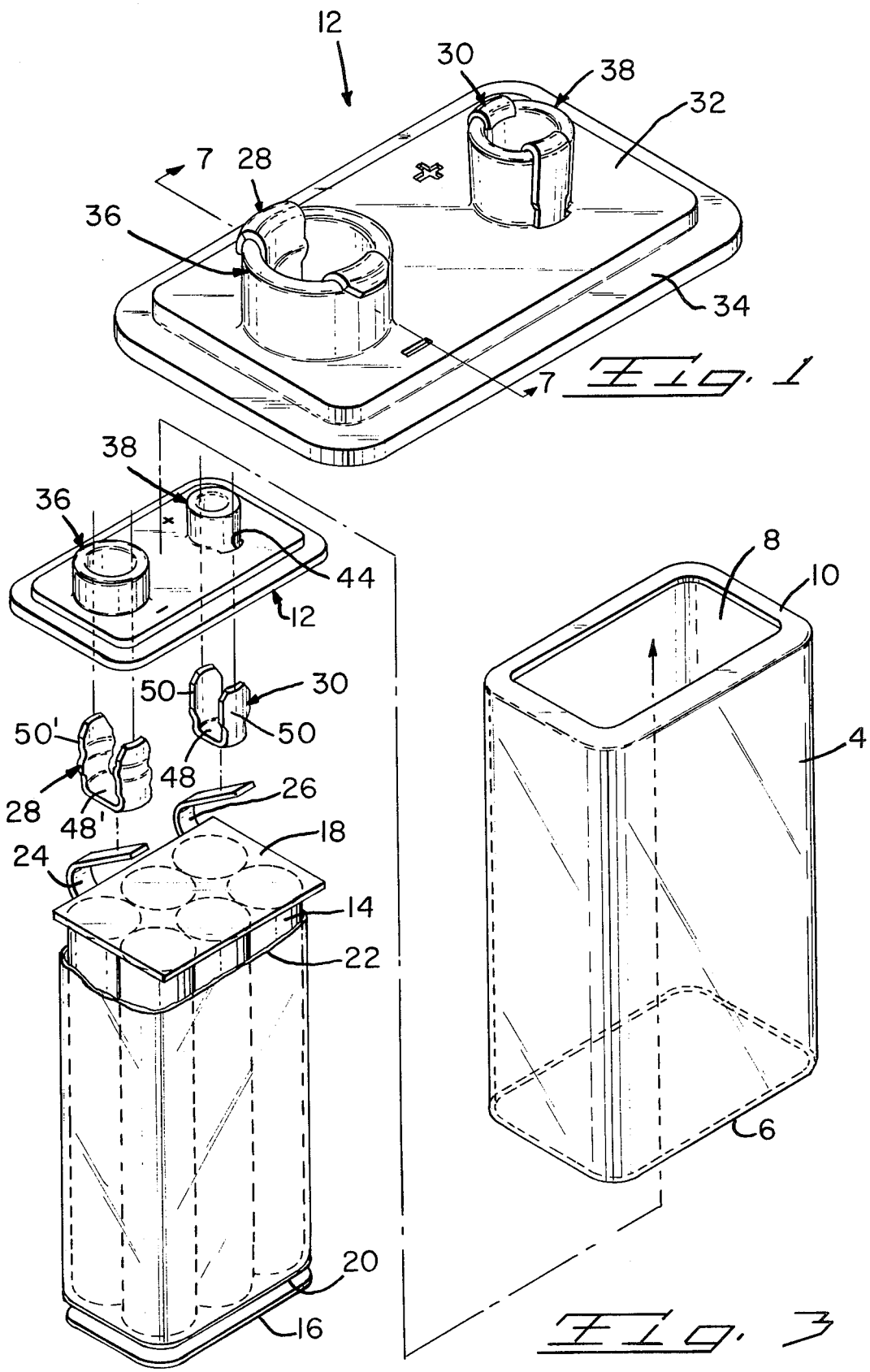

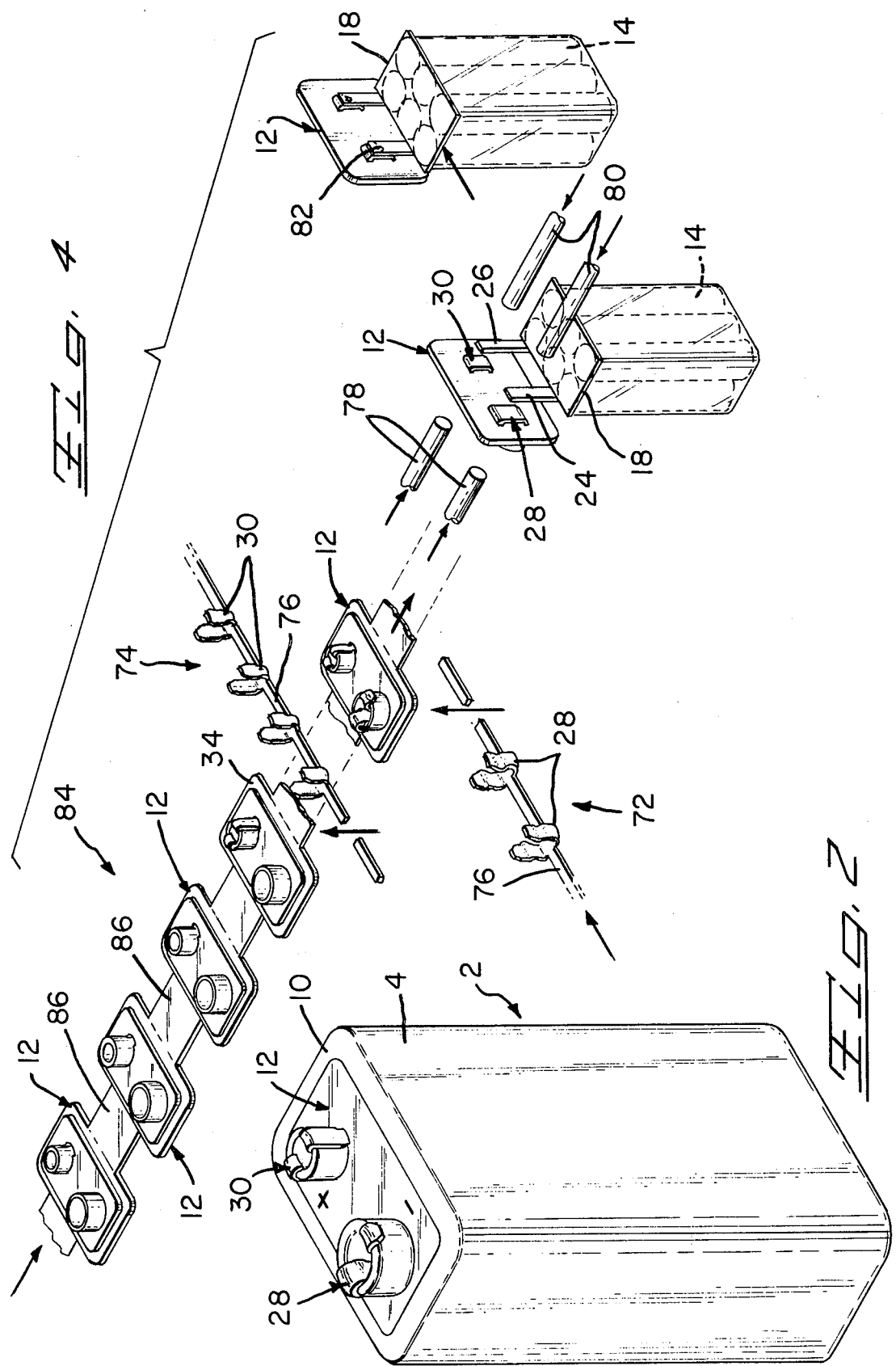

CONNECTOR OF A TYPE USED WITH DRY CELL BATTERIES AND MANUFACTURING METHOD

FIELD OF THE INVENTION

This invention relates to connectors of the type having plug and socket snap fastener terminals which are used for making connections to dry cell batteries.

BACKGROUND OF THE INVENTION

It is common practice in the manufacturing of miniature 9-volt dry cell batteries to provide a tubular housing or jacket which contains the battery cells. The housing has one open end which is closed by an insulating support having snap fastener terminals on its external surface. These terminals are ordinarily riveted to the closure and the rivets in turn are connected to the cells of the battery. Lead wires or other lead conductors are connected to the terminals of the battery by a connector having complementary snap fastener plug and socket terminals.

It would be desirable to simplify the terminals used for dry cell batteries of the type described above. The use of snap fasteners and the use of rivets to secure the snap fasteners to the closure or other connector requires that two parts be used for each terminal, the snap fastener terminal itself and the rivet would secure the terminal to the insulating support. The assembly process is somewhat complicated by reason of the fact that the parts must be located on the insulating support and the rivets thereafter set to secure the terminals to the support. The present invention, in accordance with one aspect thereof, is directed to the achievement of an improved connector having plug and socket snap fasteners thereon of the type which are used for dry cell batteries. The connector can be used as a closure for the housing or jacket of the battery or can be used to connect lead wires to the terminals of a battery.

In accordance with a further aspect thereof, the invention is directed to the achievement of improved connectors having snap fasteners on an insulating support and having improved connecting means for connecting the terminals to other conductors, such as wires or conductors on a circuit board. In accordance with a further aspect, the invention is directed to the achievement of improved manufacturing methods for producing connectors having snap fastener terminals mounted on an insulating support.

A connector in accordance with the invention commprises a generally flat insulating support of molded thermoplastic material having an integral plug terminal supporting portion and an integral socket terminal supporting portion on one of its surfaces. The plug terminal and the socket terminal are one piece stamped and formed sheet metal members having first and second contact portions. Each of the terminals is partially inserted through the insulating support so that the first contact portion is on the first surface of the insulating support and the second contact portion is on a second surface which is oppositely directed with respect to the first surface. The first contact portion of the plug terminal is against, and supported by, the plug terminal supporting projection and the first contact portion of the socket terminal is against and supported by the socket terminal supporting projection. The terminals are preferably U-shaped and the sidewalls of each terminal are inserted through the support and serve as first or external contact portions. The socket terminal supporting projection is hollow and the sidewalls of the socket terminal are against the internal surface of the socket terminal projection.

Connectors in accordance with the invention can be produced in continuous strip form with the platelike support of each connector integral with adjacent connectors in the continuous strip. The terminals can also be manufactured in strip form and assembled to the insulating supports by automatic or semi-automatic assembly machinery.

DESCRIPTION OF THE DRAWINGS

FIG. 1 is a perspective view of a closure member for a 9-volt battery having terminals assembled thereto.

FIG. 2 is a perspective view of an assembled 9-volt battery in accordance with the invention.

FIG. 3 is an exploded view showing the parts of the battery in FIG. 2.

FIG. 4 is a perspective view illustrating the assembly of terminals to closure members in the welding of battery leads to the terminals on the closure members.

PREFERRED EMBODIMENT OF THE INVENTION

Figure 5:
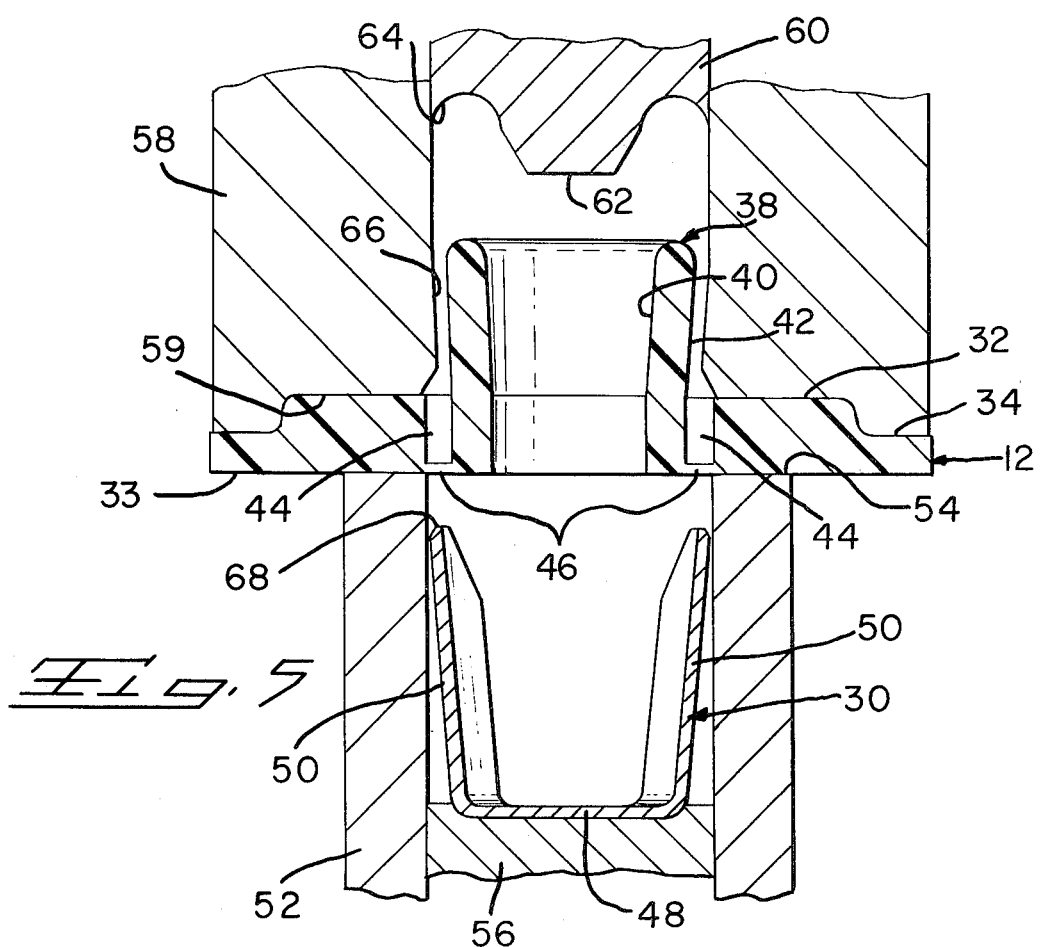
FIG. 5 is a cross-sectional view showing the type of tooling which is used to assemble a plug type terminal to a closure member, this view showing the positions of the parts prior to assembly of a terminal to a closure member.

Referring first to FIGS. 2 and 3, a 9-volt battery 2 in accordance with the invention comprises a tubular jacket 4 having a rectangular cross-section and having open lower and upper ends 6, 8. The upper end of the jacket has an inwardly turned lip or flange, as shown at 10, which retains the upper insulating closure 12 in the jacket. The jacket contains a plurality of individual cells 14 which are connected in series with each other and the cells are retained in the jacket by a lower closure 16. Insulating spacers 18, 20 are positioned against the upper ends and the lower ends of the cells, and the cells are further held in a compact bundle by a plastic envelope as shown at 22. Ribbonlike leads 24, 26 extend from the cells and are connected to terminals 28, 30 which are mounted in the upper closure 12 in a manner described below.

The upper closure 12, which serves as a connector, is of molded thermoplastic material, such as polypropylene or nylon, and is generally rectangular to conform to the cross-section of the jacket. Closure 12 has an upper surface 32 and a lower surface 33, as viewed in the drawing. The upper surface is the external surface in the assembled battery and the lower surface 33 is the internal surface. The closure is of reduced width around its periphery as shown at 34, so that the central section of the closure will be snugly received in the open upper end 8 of the jacket.

Two terminal supporting portions 36, 38 are integral with the closure 12 and extend upwardly from the external surface 32 of the closure. These terminal supporting portions support the two terminals 28, 30 in a manner described below.

Referring now to FIG. 5, the terminal support 38 for the terminal 30 is a hollow, slightly conical projection having an internal surface 40 and an external surface 42, which is inclined outwardly from the base of the support. Opposed recesses 44 extend inwardly from the surface 32 and partially surround the support 38, the inner ends of these recesses 44 being closed by thin membranes 46 which are produced when the closure is molded.

Figure 6:
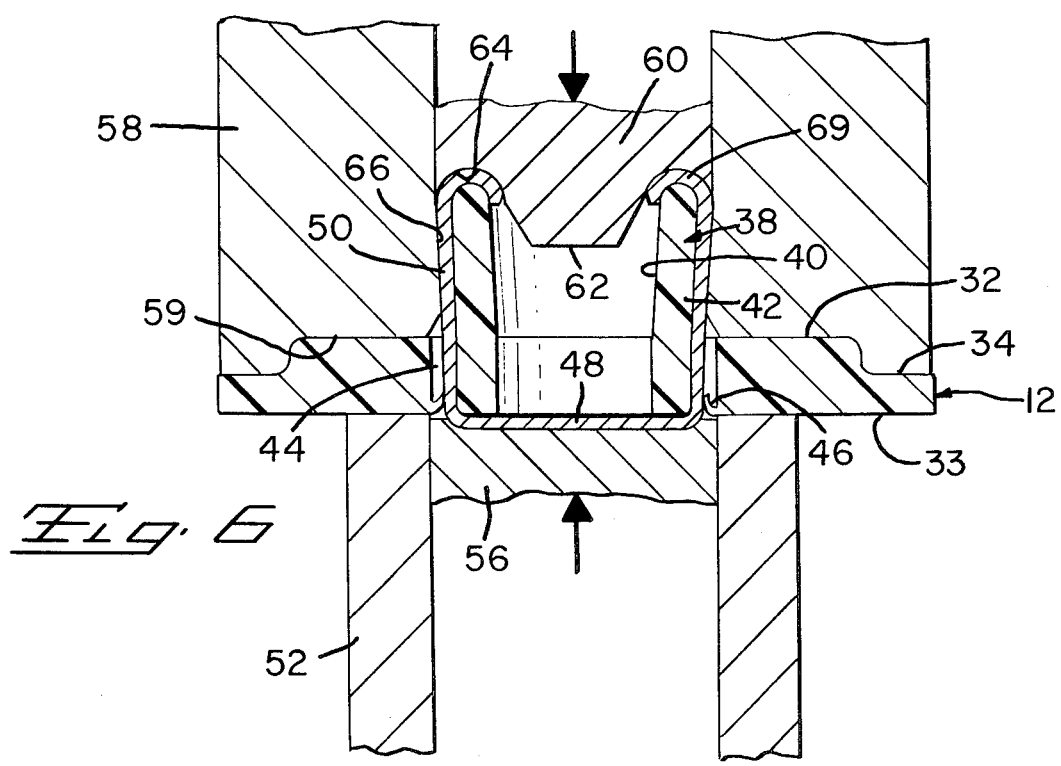
FIG. 6 is a view similar to FIG. 5, showing the positions of the parts after the terminal has been assembled to the closure member.

The terminal 30 is a generally U-shaped member having a web 48 and arcuate opposed sidewalls 50 which extend upwardly from the web. The curvature of the sidewalls conforms to the external surface 42 of the terminal support 38 so that the terminal sidewalls will be against the external surface 42 of the support when the parts are assembled as shown in FIG. 6. The terminal 30 and the terminal 28 should be of a conductive sheet metal. Good results will be obtained with a low carbon cold rolled steel, such as the steels identified in the Unified Numbering System as G-10080 or G-10100. The terminals can be plated with nickel and with overplated with tin for enhanced electrical characteristics and corrosion protection.

The tooling used to assemble the terminal 30 to the closure 12 comprises a lower guide 52 having a cylindrical circular opening in which a lower insertion tool 56 is slideably mounted. The guide 52 has a supporting surface 54 on which the closure 12 is supported with the terminal supporting portion 38 concentric with respect to the opening in the guide. The closure 12 is clamped against the surface 54 by an upper guide 58 having a lower surface 59 which conforms to the surface 32 of the closure. The upper guide 58 has a central opening in which a ram 60 is slideably contained. The lower portions of this opening converge slightly, as shown at 66, so that these portions of the opening are substantially parallel to the diverging surface portions 42 of the support 38.

The ram 60 has a lower end which has a central projecting portion 62 that is surrounded by a toroidal recess 64. The surface of the recess 64 functions as a forming surface in that it forms the upper ends 68 of the sidewalls 50 of the terminal inwardly and over the upper free ends of the support 38.

When the terminal 30 is assembled to the closure 12 in FIG. 5, the lower inserter 56 is moved upwardly until the upper ends 68 of the sidewalls 50 pierce the membranes 46 and the sidewalls extend along the external surface 42 of the support 38. Thereafter, the ram 60 is moved downwardly to the position of FIG. 6 and the ends 68 of the sidelines are formed inwardly as shown, so that the terminal is securely fixed to the support.

The membranes 46 are not destroyed when they are pierced by the sidewalls 50 and the edges of the membranes which are formed upon piecing bear against the sidewalls of the terminals and provide a seal which surrounds the sidewalls 50.

As an alternative to the tooling shown in FIGS. 5 and 6, the upper tooling can be a single clamping member having the upper ram 60 integral with the guide 58. The single upper tool would have the forming surfaces 64 located in the position shown in FIG. 6 so that upon upward movement of the lower ram 56, the ends 68 of the sidewalls 50 would move against the surface 64 and be formed over the free upper ends of the terminal supporting portion 38.

The terminal 30 and support 38 are dimensioned to be received in snap fastener socket terminals which may be secured to the ends of wires. The terminals and the support 38 will be sufficiently resilient to cooperate with a socket terminal fastener on a lead wire.

Figure 7:
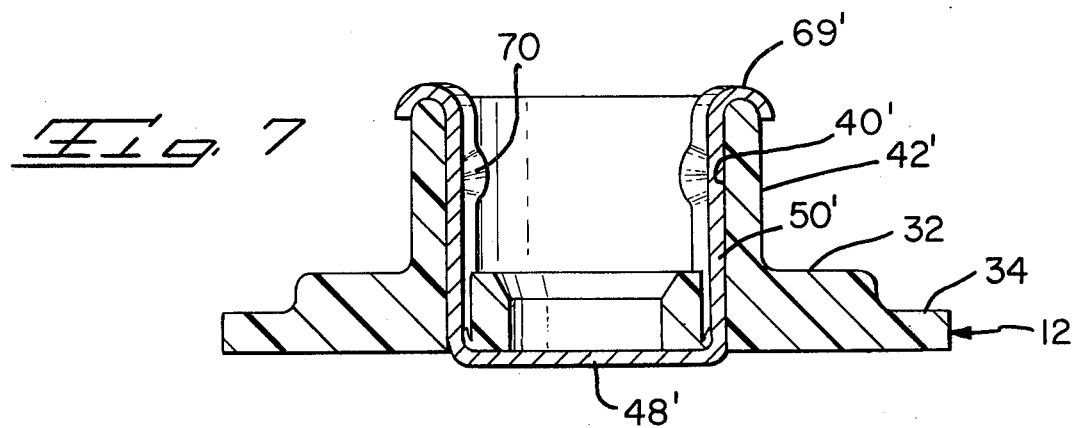
FIG. 7 is a cross-sectional view taken along the lines 7—7 of FIG. 1.

The socket terminal 28 is similar in many respects to the plug terminal 30 and the parts of the socket terminal shown in FIG. 7 are identified with the same reference numerals, differentiated by prime marks, as are used to identify the parts of the plug terminal in FIGS. 5 and 6. It will be apparent from FIG. 7 that the integral support 36 on the closure 12 for the socket terminal is cylindrical rather than conical, and the terminal itself is substantially cylindrical when it is assembled to the support. The recesses 44, 44' associated with the terminal support 36 are adjacent to the internal wall 40' of the support 28 so that the sidewalls of the terminal are against the internal surface of the support. The sidewalls also have inwardly directed dimples 70 which provide the snap effect of the snap fastener type terminals used for 9-volt battery connectors. The terminal 28 is a socket type terminal and is dimensioned to receive a plug terminal on a lead wire.

Closures 12, terminals 28, and terminals 30 can be manufactured as loose-piece items and the terminals can be assembled to the closure by relatively simple tooling and fixtures, if desired. Under many circumstances, however, it will be desirable to produce the closures as a continuous strip 84, the terminals 30 as a continuous strip 74, and the terminals 28 as a continuous strip 72. The closure may be produced in a continuous molding operation with each closure 12 connected to the next adjacent closure of the strip by a connecting section 86. The terminals in the strips 72, 74 are also connected to each other by connecting strip sections 76.

The terminals can be assembled to the closure by means of automatic machinery in accordance with the principles shown in FIG. 4. A terminal 30 is assembled to each closure in a first assembly station in which the leading terminal of the strip 74 is removed from the strip and assembled to the closure by tooling of the type shown in FIGS. 5 and 6. At a subsequent station, a terminal 28 is assembled to the closure and the closure is thereafter severed from the adjacent connecting section 86 of the strip 84. The leads 24, 26 can then be connected to the internal contact portions 48, 48' of the terminals in a welding station by means of electrodes 78, 80 to produce the welds shown at 82. It will be understood that the electrodes 78 can be brought to bear against the surfaces of the webs 48, 48' of the terminals because of the fact that the support members 36, 38 are hollow.

The continuous strip 84 of closures can also be used to carry the cells of the batteries along a production line beyond the station shown in FIG. 2 at which the leads 24, 26 are welded to the internal contact portions of the terminals as shown at 82. If this alternative manufacturing process is employed, the closures are not severed from the strip 84 at the welding station and the strip, with the cell leads 24, 26 welded to the terminals, is fed to subsequent assembly stations at which the jacket 4 would be assembled to the cells, the bottom closures would be assembled to the jackets of the battery, and the ends of the jackets would be formed over the closures. Severing of the closures 12 from the strip 84 would take place during the final stages of the manufacturing process.

The supported terminals 28, 30 on a battery closure as described above, can be coupled to identical terminals on a connector of the type used to connect lead wires to a 9-volt battery. The supported terminals 28, 30 can also be coupled to snap fastener terminals of the all-metal type which are at present used as connectors for connecting lead wires to terminals on a 9-volt battery.

The snap action of the terminals 28, 30 is preferably obtained entirely, or almost entirely, from the terminal supporting portions 36, 38 of the connector of closure 12. The terminals 28, 30 can therefore be of relatively thin metal.

Figure 8:
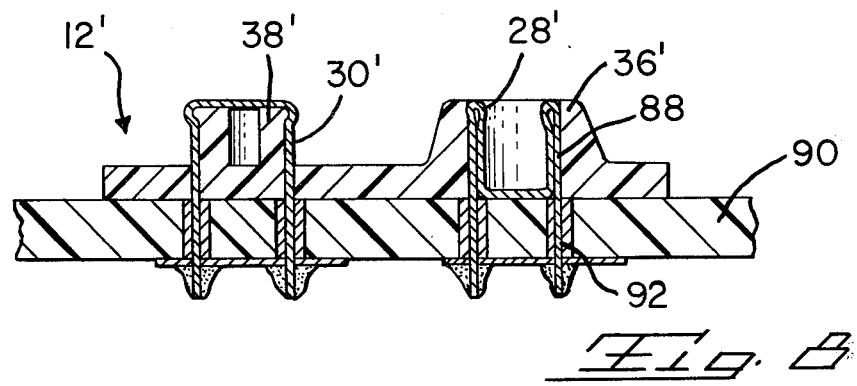
FIG. 8 is a cross-sectional view of an alternative embodiment intended for mounting on c circuit board.

FIG. 8 shows a connector 12' which is in many respects similar to the connector or closure 12 described above but which is adapted to be mounted on a circuit board 90. The sidewalls 92 of the terminals extend through the circuit board and are soldered to conductors on the underside of the board as shown. In this embodiment, the plug terminal 30' extends over the upper surface of the support 38' and the web of the terminal, therefore, rests on the upper surface of the support 38'. The socket terminal 28' has a double thickness of metal contained in the hollow interior of the support 36'. The terminals 28', 30' are in the embodiment of FIG. 8 inserted downwardly, as viewed in the drawing, into the surface 32' and beyond the lower surface 33' of the support.

Figure 9:
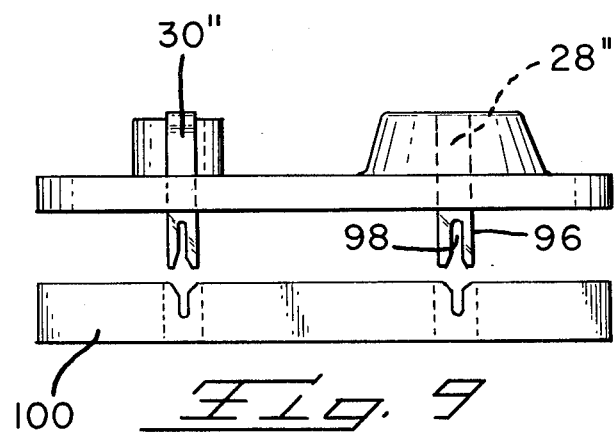
FIG. 9 is a side view of a further embodiment in which the terminals have wire receiving slots for connecting lead wires to the terminals.

FIG. 9 shows a further embodiment in which the end portions 96 of the sidewalls have wire receiving slots 98 by means of which the terminals can be connected to lead wires. The terminals 30" and 28" have been oriented in FIG. 9 such that the wire receiving slots 98 are in side-by-side relationship rather than aligned relationship. A suitable plastic cover 100 can be provided on the lower surface of the connector shown in FIG. 9. This type of connector can then be used to connect lead wires to a 9-volt battery. The cover can be retained on the flat molded support by a detent means or an adhesive.

I claim:

1. A connector of the type comprising an insulating support having a snap fastener plug terminal and a snap fastener socket terminal on a first surface thereof, said snap fastener plug and socket terminals being dimensioned to be coupled to a complementary snap fastener socket terminal and a snap fastener plug terminal respectively on a similar connector, said connector being characterized in that:

said support comprises a molded thermoplastic member having an integral plug terminal supporting portion and an integral socket terminal supporting portion on said first surface, said plug terminal and said socket terminal each being a one-piece stamped and formed sheet metal member having first and second contact portions, each of said terminals being partially inserted through said support so that the first contact portion of each terminal is on said first surface of said support and said second contact portion is on a second surface of said support which is oppositely directed with respect to said first surface, said first contact portion of said plug terminal being against, and supported by, said plug terminal supporting portion, said first contact portion of said socket terminal being against, and supported by, said socket terminal supporting portion.

2. A connector as set forth in claim 1, said plug terminal supporting portion and said socket terminal supporting portion each comprising a generally cylindrical projection on said first surface, said plug terminal supporting portion and said socket terminal supporting portion each having an external surface, said socket terminal supporting portion being hollow and having an internal surface, said first contact portion of said plug terminal being against the external surface of said plug terminal supporting portion, said first contact portion of said socket terminal being against the internal surface of said socket terminal supporting portion.

3. A connector as set forth in claim 2, each of said terminals being generally U-shaped having a web and sidewalls, said web of each terminal being said second contact portion, said sidewalls of each terminal being said first contact portion, said terminals being partially inserted through said support from said second surface to said first surface, said web portions of said terminals being against said second surface.

4. A connector as set forth in claim 3, said sidewalls of said terminals and said terminal supporting portions of said insulating support having free ends, said free ends of said sidewalls of said terminals being formed over said free ends of said terminal supporting portions.

5. A connector as set forth in claim 4, said support being a rectangular closure for one end of a tubular jacket for a dry cell battery.

6. A connector as set forth in either of claims 1 or 5, said connector being integral with a continuous strip of identical connectors, the insulating support of each connector being integral with the insulating support of adjacent connectors.

7. A connector as set forth in claim 1, each of said terminals being partially inserted through said support from said first surface to said second surface.

8. A connector as set forth in claim 7, said second contact portions of said terminal extending beyond said second surface of said support.

9. A connector as set forth in claim 8, said second contact portion of each of said terminals having a wire-receiving slot therein whereby wires can be inserted into the slots to contact the wires to the terminals.

10. A connector as set forth in claim 8, said second contact portions of said terminals comprising solder tabs.

11. A connector as set forth in either of claims 9 or 10, said connector being integral with a continuous strip of identical connectors, the insulating support of each connector being integral with the insulating support of adjacent connectors.

12. A dry cell battery of the type comprising a tubular jacket having at least one open end, at least one cell contained in said jacket, an insulating closure in said open end, said closure having an internal surface and an external surface, at least one terminal on said external surface, said terminal being connected to said cell, said battery being characterized in that:

said closure is a molded thermoplastic member having terminal supporting portions on said external surface, said terminal being a shaped sheet metal member having external contact portions and internal contact portions, said external contact portions being on said external surface of said closure and being supported on said terminal supporting portions, said internal contact portions being contained within said jacket and being adjacent to said internal surface of said closure, said terminal being partially inserted through said closure from one side to the other side so that said external contact portions are on said external surface and said internal contact portions are adjacent to said internal surface, and cell connecting means in said jacket serving to connect said internal contact portions to said cell.

13. A dry cell battery as set forth in claim 12, said terminal supporting portions comprising a generally cylindrical upstanding projection on said external surface of said closure, said external contact portions of said terminal being against surface portions of said projection.

14. A dry cell battery as set forth in claim 13, said projection being hollow, said external contact portions of said terminal being against the outside surface of said projection, said terminal being a plug terminal which is dimensioned to be mated with a complementary socket terminal.

15. A dry cell battery as set forth in claim 13, said projection being hollow, said external contact portions of said terminal being against the inside surface of said projection, said terminal being a socket terminal which is dimensioned to receive a complementary plug terminal.

16. A dry cell battery as set forth in claim 12, said closure having two terminal supporting portions on the external surface thereof.

17. A dry cell battery as set forth in claim 16, each of said terminal supporting portions comprising a hollow cylindrical projection on the external surface of said closure, one of said terminals having its external contact portions against the external surface of its associated projection and the other of said terminals having its external contact portions against the internal surface of its associated projection, said one terminal being a plug terminal and the other terminal being a socket terminal.

18. A dry cell battery as set forth in either of claims 12 or 17, said terminal being U-shaped and being inserted through said closure from the internal surface of said closure to the external surface.

19. A method of making a dry cell battery of the type comprising a tubular jacket having an open end, a flat platelike closure in said open end, said closure having a first surface which is the external surface of the closure and a second surface which is the internal surface of the closure, a plug type snap fastener terminal and a receptacle type snap fastener terminal on said first surface, said terminals extending through said closure to said second surface and being connected to a power source which is contained in the jacket, said terminal extending normally of said first surface, said method comprising the steps of:

producing said closure as a thermoplastic molded part having integral terminal supporting portions extending from said first surface, producing said terminals as sheet metal stamped and formed members, each having an external contact portion and an internal contact portion and with one of the portions having an edge and being capable of being inserted through said closure upon pushing the edge through the closure, inserting said terminals through said closures so that the external contact portion of each terminal is against, and supported by, its associated terminal supporting projection and its internal contact portion is proximate to said second surface of said closure, and assembling the power source and the closure to the jacket so that the power source is electrically connected to the internal contact portions of the terminals.

20. A method of making a dry cell battery as set forth in claim 19 in which said terminals are inserted through said closure from the second surface to the first surface.

21. A method as set forth in claim 20 in which each of said terminals is substantially channel-shaped having a web and sidewalls, the sidewalls of each terminal being the external contact portion and the web being the internal contact portion, the sidewalls of the terminals having free ends, each of said free ends having an edge thereon which is pushed through said closure.

22. A method of making a dry cell battery as set forth in claim 21 in which said closure is produced as a single closure in a continuous strip of closures and said terminals are produced as single terminals in continuous strips of terminals, said terminals being assembled to said closure by the steps of feeding said strip to an assembly zone, severing said terminals from said strip, moving said terminal towards, and inserting said terminals through said closure, and severing said closure from said strip of closures.

* * * * *